US009927872B2

(12) United States Patent
Yang et al.

(10) Patent No.: US 9,927,872 B2
(45) Date of Patent: Mar. 27, 2018

(54) WIRELESS INPUT SYSTEM BASED ON STEADY-STATE VISUAL-EVOKED POTENTIALS

(71) Applicant: Beijing University of Technology, Beijing (CN)

(72) Inventors: Chunlan Yang, Beijing (CN); Yingnan Nie, Beijing (CN); Wan Li, Beijing (CN); Shuicai Wu, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 15/301,043

(22) PCT Filed: Oct. 27, 2015

(86) PCT No.: PCT/CN2015/092915
§ 371 (c)(1),
(2) Date: Sep. 30, 2016

(87) PCT Pub. No.: WO2017/012217
PCT Pub. Date: Jan. 26, 2017

(65) Prior Publication Data
US 2017/0185150 A1    Jun. 29, 2017

(30) Foreign Application Priority Data

Jul. 20, 2015 (CN) .......................... 2015 1 0429097

(51) Int. Cl.
*G09G 5/00* (2006.01)
*G06F 3/01* (2006.01)
(Continued)

(52) U.S. Cl.
CPC .............. *G06F 3/015* (2013.01); *G06F 3/013* (2013.01); *G06F 3/04886* (2013.01); *H04W 4/008* (2013.01)

(58) Field of Classification Search
CPC ...... G06F 3/015; G06F 3/013; G06F 3/04886; H04W 4/008
See application file for complete search history.

(56) References Cited

U.S. PATENT DOCUMENTS

| 4,869,264 | A | * | 9/1989 | Silberstein | ......... | A61B 5/04842 |
| | | | | | | 600/544 |
| 2003/0225342 | A1 | * | 12/2003 | Hong | ...................... | G06F 3/015 |
| | | | | | | 600/558 |

(Continued)

FOREIGN PATENT DOCUMENTS

| CN | 101159086 A | 4/2008 |
| CN | 104503571 A | 4/2015 |

*Primary Examiner* — Rodney Amadiz

(57) ABSTRACT

A wireless BCI input system for mobile intelligent devices is described. The system may include an SSVEP keyboard for stimulating SSVEP signals and an EEG headband for acquiring EEG signals. The SSVEP keyboard may include sixteen virtual buttons and a mask that can be replaced to change functions of the virtual buttons. The EEG headband may include an EEG acquisition module, an EEG analysis module, and a Bluetooth communication module, which are used for acquiring EEG signals, determining the user's input intentions, and sending characters or controlling commands to a matched mobile intelligent device via Bluetooth connection.

4 Claims, 6 Drawing Sheets

(51) Int. Cl.
G06F 3/0488 (2013.01)
H04W 4/00 (2018.01)

(56) References Cited

U.S. PATENT DOCUMENTS

| | | | |
|---|---|---|---|
| 2008/0055265 A1* | 3/2008 | Bewley | G06F 3/04886 |
| | | | 345/173 |
| 2009/0187114 A1* | 7/2009 | Morikawa | G06F 3/015 |
| | | | 600/545 |
| 2012/0172743 A1* | 7/2012 | Aguilar | A61B 5/048 |
| | | | 600/544 |
| 2013/0127708 A1* | 5/2013 | Jung | A61B 5/0006 |
| | | | 345/156 |
| 2014/0329464 A1* | 11/2014 | Yoon | H04W 4/008 |
| | | | 455/41.1 |

* cited by examiner

WIRELESS INPUT SYSTEM BASED ON STEADY-STATE VISUAL-EVOKED POTENTIALS

CROSS REFERENCE TO RELATED APPLICATION

This application is a national stage application of international application number PCT/CN2015/092915, filed Oct. 27, 2015, titled "A wireless input system based on steady-state visual-evoked potentials," which claims the priority benefit of Chinese Patent Application No. 201510429097.2, filed on Jul. 20, 2015, which is hereby incorporated by reference in its entirety.

TECHNICAL FIELD

The present disclosure relates to a wireless input system based on a brain-computer interface (BCI), which belongs to a category of human-computer interaction technology.

BACKGROUND

BCI is an information transmission channel between a human brain and a computer or other electronic devices. This technique does not rely on the peripheral nervous system and muscles, and therefore provide a direct brain-computer communication pathway.

Currently available BCI systems can be grouped into two categories based on methods for acquisition of human brain activities: invasive methods (e.g., ECoG and sEEG) and non-invasive methods (e.g., EEG and MEG). Invasive methods can get more accurate signals, but are not proper for daily uses due to their invasive manners. Thus, studies focus on non-invasive methods. Among existing non-invasive techniques, EEG is one of the most widely used approaches because of its practicability and low cost.

Various BCI systems have been developed by different research groups. For example, Graz BCI is a cue-based system, which was developed by University of Technology Graz (Austria). The Graz BCI system uses imagery of motor action as an appropriate mental task. Several clinical applications of Graz BCI operations for hand orthosis have been reported. The Wadworth Center (US) developed a BCI system named BCI2000, which provides a flexible general-purpose platform that facilitates the evaluation, comparison, and a combination of alternative brain signals, processing methods, applications, and operating protocols.

Traditional BCI systems require multi-channel EEG facilities for measuring brain activities, which is complex and cumbersome. Furthermore, most of these systems need PCs for analysis of EEG signals. These constraints limit applications of BCI systems in a laboratory-scale.

SUMMARY

The present disclosure relates to a portable and easy-to-use wireless BCI-based input system that is designed for daily uses. Using the input system, users can input characters or send commands to a mobile intelligent device via Bluetooth connection by gazing at relevant virtual buttons.

To achieve the above purposes, the present disclosure provides a wireless BCI-based input system comprising a SSVEP keyboard and an EEG headband. The SSVEP keyboard may include sixteen virtual buttons that flash at different frequencies to represent characters and stimulate the SSVEP signals. The functions of the EEG headband include acquiring and analyzing EEG signals, and then communicating with a mobile intelligent device via Bluetooth connection.

The SSVEP keyboard may include a casing, sixteen virtual buttons, and a mask. The casing is used for isolating the light sources. Each virtual button further may include a square-wave generator and an LED. The square-wave generator may include a NE555 chip, resistances and capacitances, and produce square wave with a constant frequency, which drives the LED flashing. The mask is used for representing the function of each virtual button and can be inserted into the casing with a drawer-like structure and be replaceable.

The EEG headband may include an EEG acquisition module, an EEG analysis module, a communication module, and a headband. The EEG acquisition module acquires the user's scalp EEG signal by amplification, filtration, and AD-conversion. The EEG analysis module extracts SSVEP signals and performs the classification. The classification result is converted into characters or control commands, which are then sent to the matched mobile intelligent device by the communication module via Bluetooth connection. The EEG acquisition module, EEG analysis module, and communication module are assembled on the headband.

The EEG acquisition module may include three electrodes and an electric circuitry, which further may include a two-stage amplifier (gain: 1000), a band-pass filter (passband: 5-40 Hz) and an AD-converter (sample rate: 512 Hz). Two of these electrodes are embedded in the headband and are connected to the amplifier input; the other electrode is embedded in an ear clip and is connected to ground.

The EEG analysis module may include a single-chip computer that runs an analysis program. The analysis steps of the program may include buffering data, removing the DC components, eliminating baseline drift, executing time-frequency transformation, extracting features, identifying none-control state, and classifying.

The communication module may include a Bluetooth module and an antenna, and is used to send characters or control commands to the mobile intelligent device via Bluetooth communication protocols.

DETAILED DESCRIPTION OF THE PREFERRED EMBODIMENTS

To explain the technical content of the present disclosure, the details of embodiments are described as follows.

Figure 1:
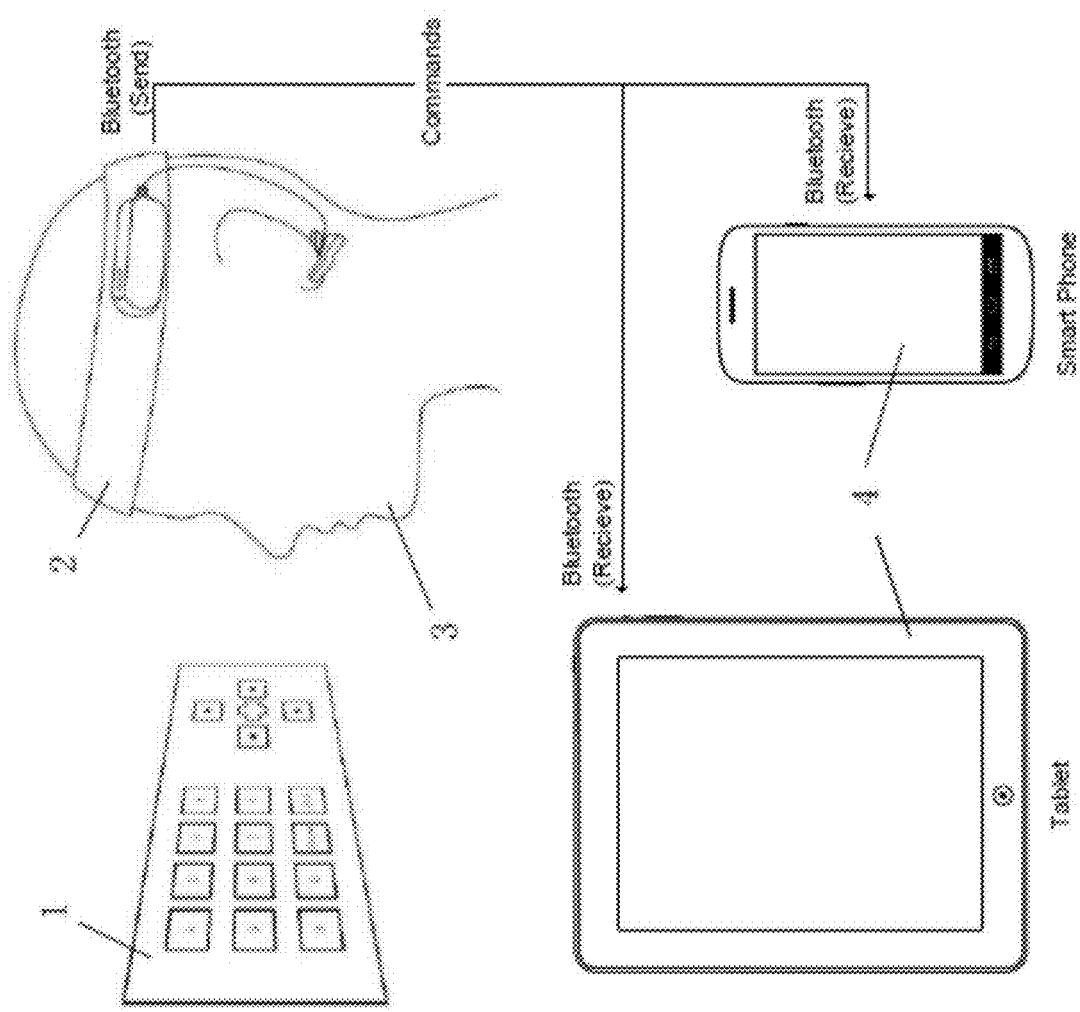
FIG. 1 shows a framework illustrating some embodiments of the present disclosure.

Referring to FIG. 1, user (3) needs to put the EEG headband (2) on head, places the SSVEP keyboard (1) in front to match the EEG headband (2) with the mobile intelligent device (4) via Bluetooth connection. When entering an input with the present disclosure, the user (3) needs to concentrate and gaze at one of the virtual buttons on the SSVEP keyboard (1).

Figure 2:
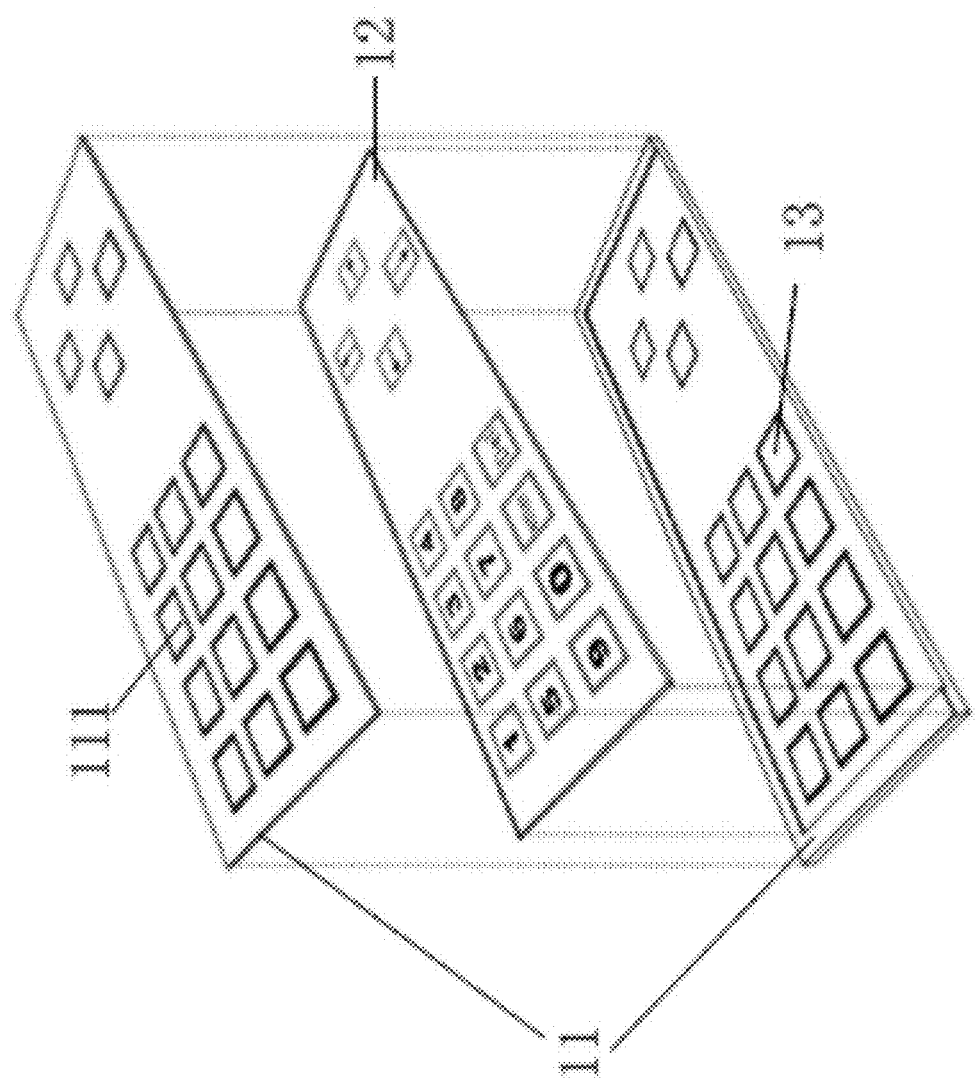
FIG. 2 shows a structure of a SSVEP keyboard.

Referring to FIG. 2, the LEDs (13) are embedded in the bottom of the SSVEP keyboard, and the mask (12) is inserted into the casing (11) covering the LEDs. The mask (12) is made of translucent materials to filter the light of LEDs and to protect the user's eyes. The window (111) on top of the casing (11) is made of transparent material, and the other parts of the casing are made of opaque materials.

Figure 3:
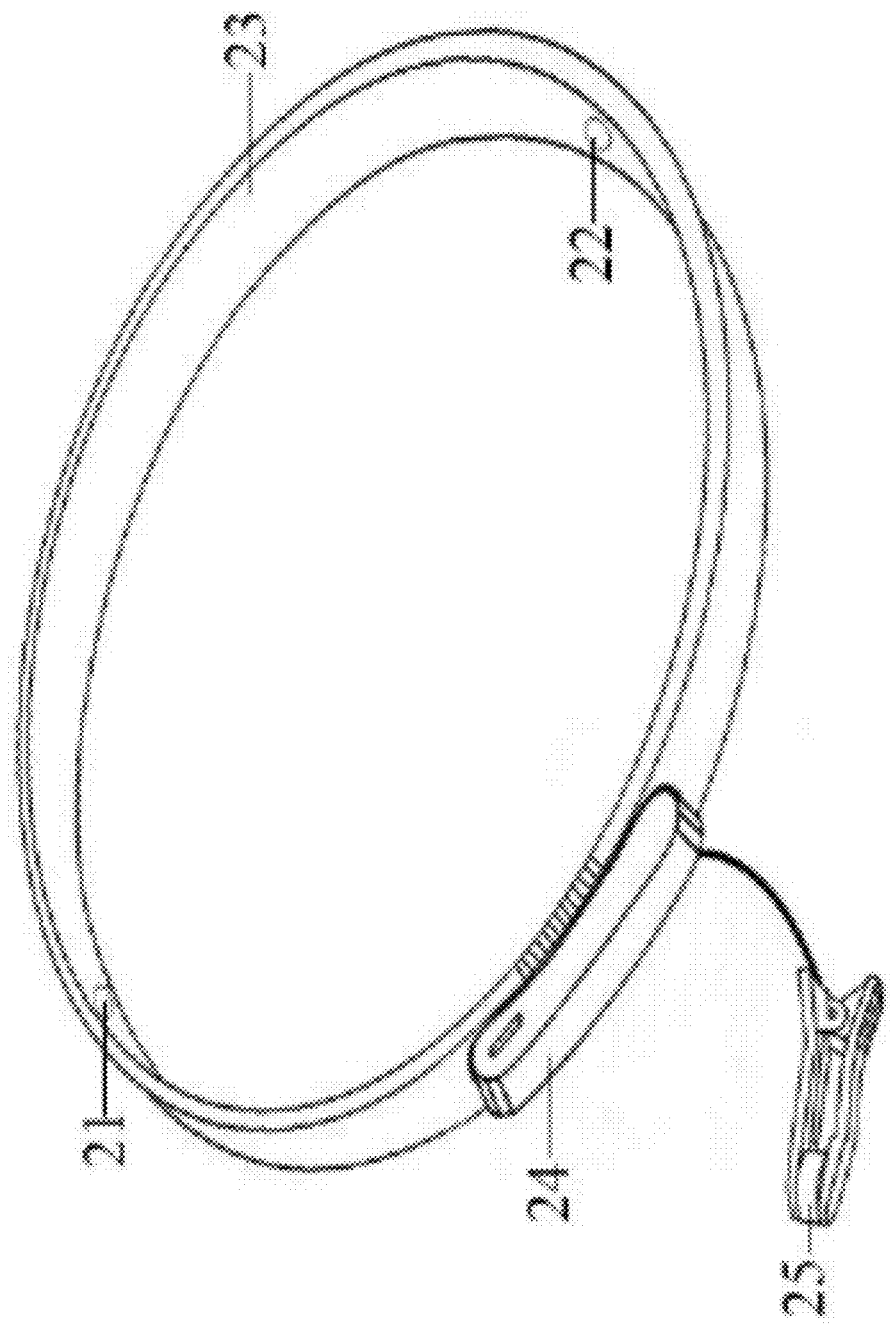
FIG. 3 shows a structure of a EEG headband.

Referring to FIG. 3, the frontal electrode (21) and the occipital electrode (22) are embedded in the headband (2). The EEG acquisition module, EEG analysis module, and communication module are assembled in a plastic casing (24). When using this system, the headband (23) needs to be adjusted to ensure the frontal electrodes (21) and the occipital electrode (22) cling on the frontal skin and the occipital scalp of the user (3), respectively. The ear-clip electrode (25) needs to be clipped to the user's left ear lobe.

Figure 4:
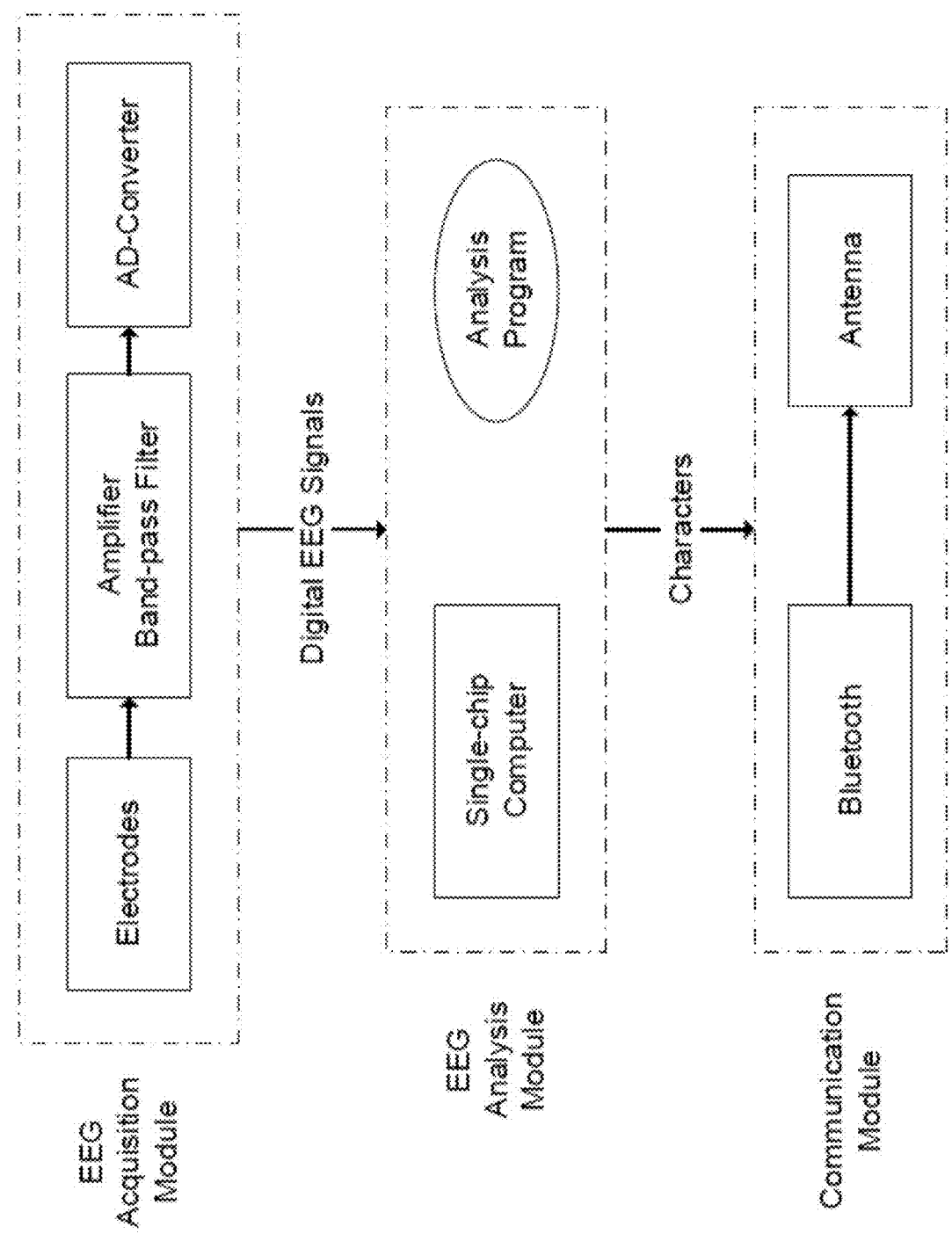
FIG. 4 shows connections of different parts of the present disclosure.

Referring to FIG. 4, the EEG signals acquired by electrodes pass though the amplifier, the band-pass filter and the AD converter step-by-step. After this procedure, the signals are converted into digital format, which are then analyzed by the EEG analysis module. Characters and control commands resulting from the analysis program are passed to the communication module.

Figure 5:
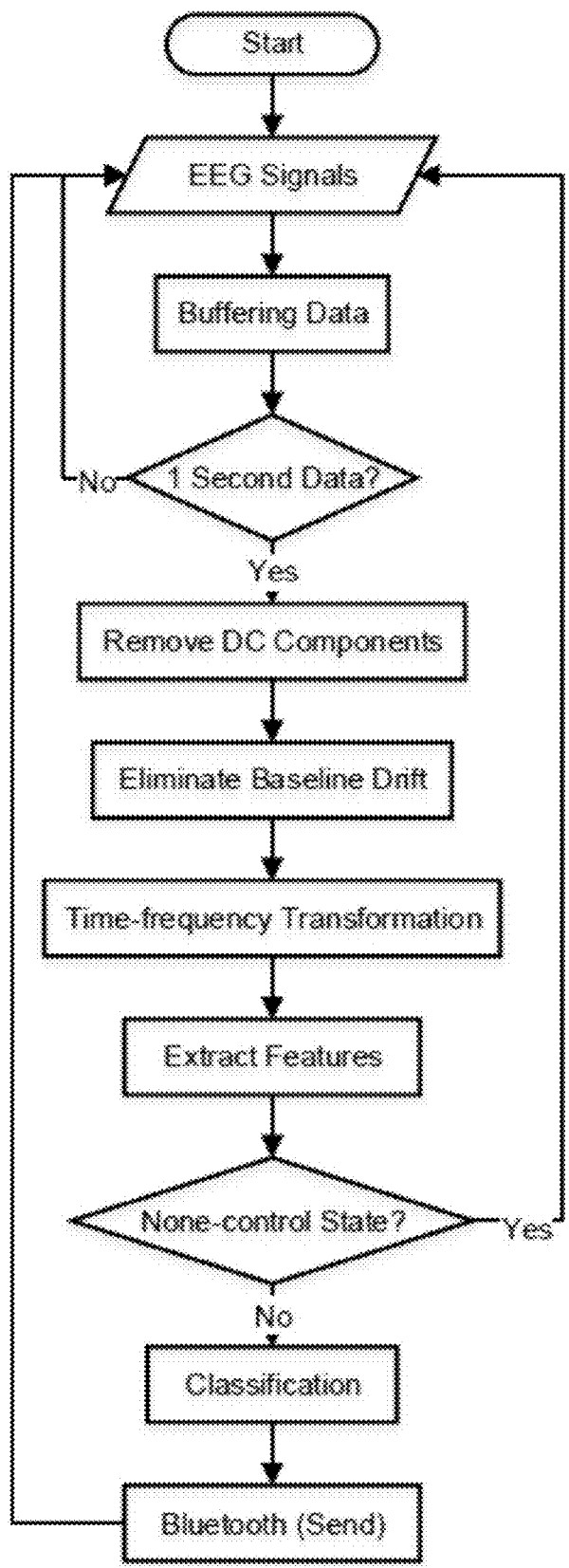
FIG. 5 shows a flowchart of a EEG analysis program.
Figure 6:
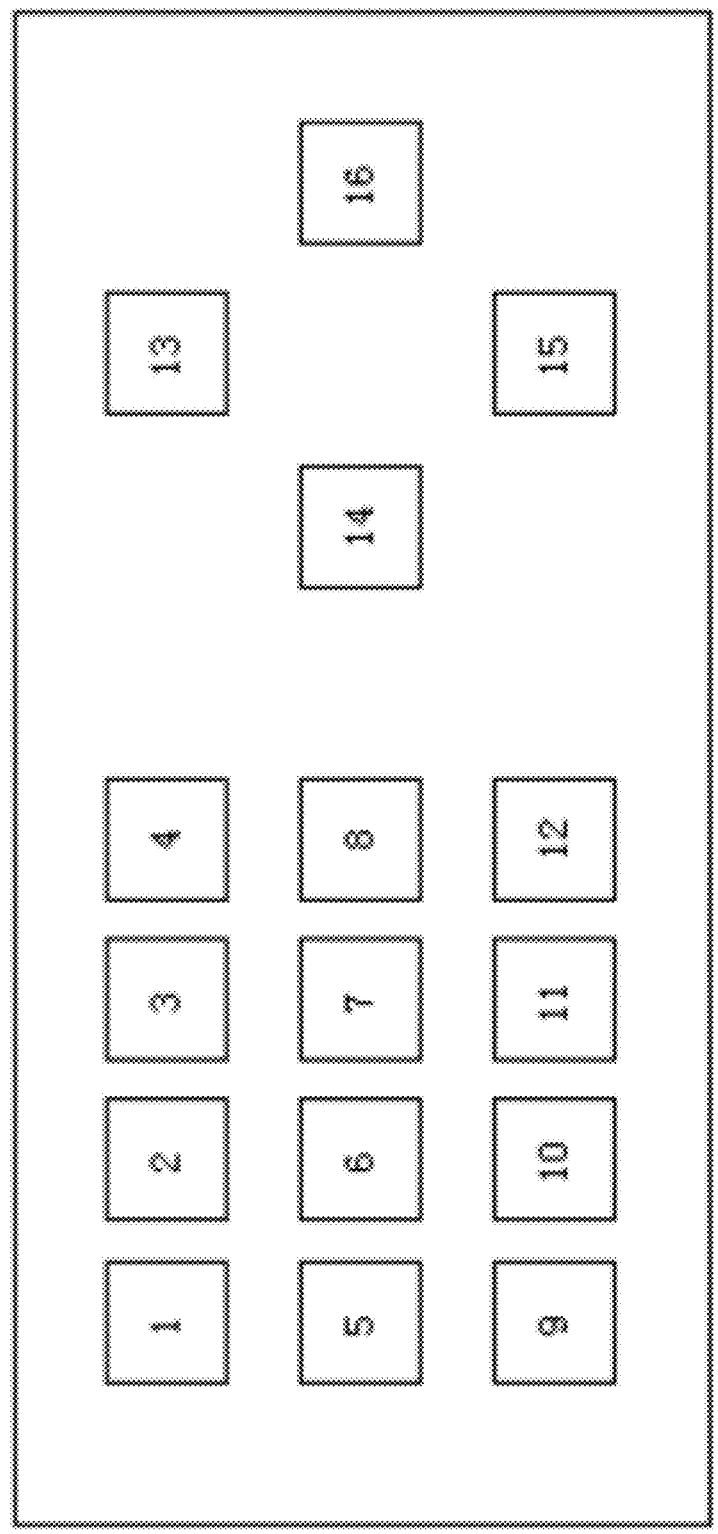
FIG. 6 shows button IDs of a SSVEP keyboard.

Referring to FIG. 5, the procedures for the analysis program may include buffering data, removing the DC components, eliminating baseline drift, executing time-frequency transformation, extracting features, identifying none-control state, and classifying. EEG signals are segmented into 1 second pieces, and each piece of data is analyzed separately.

For advanced users, the functions of each virtual button can be customized by setting the EEG headband to custom mode via a hardware switch. Under the custom mode, the EEG headband receives commands from the matched device via Bluetooth communication protocols. The specific implementation is detailed as follows.

First, the system is set to a custom mode to turn the Bluetooth module on standby after the system is connected to a smartphone or tablet PC. Second, custom commands are sent to the system via a Bluetooth serial port protocol. For example, the command format is "set##<button ID>#[customized characters]#" or "set##<button ID>#control commands#". The ID of each virtual button is shown in FIG. 5. The customized characters may be a string and the control command may be the AT (Attention) command from a standard Bluetooth communication protocol. For instance, to define the virtual button of ID 2 as string "Beijing" and the button of ID 3 as answering a call, the commands may be "set##2#Beijing#" and "set##3#AT#CE<CR><LF>#". Lastly, the mask is replaced to match a customized function of one or more of the virtual buttons.

What is claimed is:

1. A wireless brain computer interface (BCI) input system associated with a mobile intelligent device implementing steady-state visual evoked potentials (SSVEP), the system comprising;
   a SSVEP keyboard configured to represent characters and stimulate SSVEP signals such that the mobile intelligent device is controlled by a user via a virtual button; and
   an EEG headband configured to acquire EEG signals, extract SSVEP signals, analyze the EEG signals, identify user intention, and communicate with the mobile intelligent device via Bluetooth connection, wherein:
   the SSVEP keyboard comprises:
      a flash light generator configured to generate flash light,
      a casing configured to isolate light sources, and
      a mask configured to represent characters, wherein:
         the flash light generator comprising a NE555 chip, resistances, and capacitances,
         the flash light generator generates a square wave with a constant frequency to drive light-emitting diode (LED) flashing,
         LEDs are isolated with opaque plastic materials, the mask is a translucent mask covering on the LEDs, and
         the translucent mask is located below a top window and above a bottom window of the casing of the SSVEP keyboard and is replaceable;
   the EEG headband comprises:
      an EEG acquisition module configured to acquire a user scalp EEG signal by amplification, filtration, and AD-conversion,
      an EEG analysis module configured to extract SSVEP signals and to perform classification,
      a communication module configured to transfer classification results to the mobile intelligent device, and
      a headband on which the EEG acquisition module, the EEG analysis module and the communication module are fixed, wherein:
         the EEG acquisition module comprises:
            three electrodes consisting of a frontal electrode that is attached to a forehead of the user, an occipital electrode that is attached to an occipital area of the user, and an ear-clip electrode that is clipped to the left ear lobe of the user, and
            an electric circuitry that comprises a two-stage amplifier with magnification of 1000 times of the original voltage, a band-pass filter with passband of about 5-40 Hz and an AD-converter with a rate of 512 Hz,
         the EEG analysis module comprises:
            a single-chip computer that runs an analysis program configured to buffer data, remove DC components, eliminate baseline drift, execute time-frequency transformation, extract features, identify none-control state, and perform classification,
         the communication module comprises:
            a Bluetooth module, and
            an antenna, wherein the communication module is configured to send characters or control commands to the mobile intelligent device via Bluetooth communication protocols.

2. The system of claim 1, wherein the EEG headband is placed on a head of the user, the SSVEP keyboard is placed in front of the user, and the EEG headband is matched with the mobile intelligent device via the Bluetooth connection such that user input the mobile intelligence device by looking at the virtual buttons on the SSVEP keyboard;
   the LEDs on the bottom of the SSVEP keyboard is configured to flash based on predefined frequencies, the mask is made of translucent material to filter the light of the LEDs and to protect eyes of the user, a window on top of the casing is made of transparent material, and the other parts of the casing are made of opaque materials;
   a frontal electrode and an occipital electrode are embedded in the headband; the EEG acquisition module, EEG analysis module, and communication module are assembled in a plastic casing, the headband of the system is adjustable to ensure frontal electrodes and occipital electrode cling on frontal skin and an occipital scalp of the user, respectively when using this system, and an ear-clip electrode is clipped to a left ear lobe of the user; and the EEG signals are acquired by electrodes via the amplifier, the band-pass filter and an AD converter step-by-step such that the EEG signals are converted into a digital format and are then analyzed by the EEG analysis module, and characters and control commands resulting from the analysis program are transferred to the mobile intelligent device via the communication module.

3. The system of claim 1, wherein the EEG signals are segmented into 1 second pieces, and each piece of data is analyzed separately.

4. The system of claim 1, wherein each virtual button is customized by setting the EEG headband to a custom mode via a hardware switch such as to:

turn the Bluetooth module on standby when the system is set to custom mode and after which the system is connected to a smartphone or tablet PC;

send custom commands to the system via Bluetooth serial port protocols, wherein customized characters are a string or AT (Attention) command from a standard Bluetooth communication protocol; and replace the mask to match the customized function of virtual buttons.

* * * * *